United States Patent
Walton et al.

[11] Patent Number: 5,880,798
[45] Date of Patent: Mar. 9, 1999

[54] TWISTED NEMATIC LIQUID CRYSTAL DEVICE

[75] Inventors: Harry Garth Walton, Wheatley; Martin David Tillin, Abingdon; Michael John Towler, Botley, all of United Kingdom

[73] Assignee: Sharp Kabushiki Kaisha, Osaka, Japan

[21] Appl. No.: 880,455

[22] Filed: Jun. 24, 1997

[30] Foreign Application Priority Data

Jun. 26, 1996 [GB] United Kingdom ............ 9613373

[51] Int. Cl.⁶ .................. G02F 1/1337; G02F 1/1335
[52] U.S. Cl. ................. 349/99; 349/128; 349/117; 349/179; 349/181
[58] Field of Search .................. 349/99, 128, 117, 349/179, 181

[56] References Cited

U.S. PATENT DOCUMENTS

| | | |
|---|---|---|
| 4,385,806 | 5/1983 | Fergason . |
| 4,635,051 | 1/1987 | Bos . |
| 4,923,286 | 5/1990 | Grupp . |
| 5,280,375 | 1/1994 | Tsuda et al. . |
| 5,721,600 | 2/1998 | Sumiyoshi et al. ............ 349/119 |

FOREIGN PATENT DOCUMENTS

| | | |
|---|---|---|
| 467456A1 | 1/1992 | European Pat. Off. . |
| 549283A2 | 6/1993 | European Pat. Off. . |
| 616240A1 | 9/1994 | European Pat. Off. . |
| 699938A2 | 3/1996 | European Pat. Off. . |
| 1209424 | 8/1989 | Japan . |
| 2292814 | 3/1996 | United Kingdom . |

OTHER PUBLICATIONS

Matsumoto et al., "Field–Induced Deformation Of Hybrid–Aligned Nematic Liquid Crystals: New Multicolor Liquid Crystal Display", Journal of Applied Physics, vol. 47, No. 9 (Sep. 1976), pp. 3842–3845.

Kahn, "Ir–Laser–Addressed Thermo–Optic Smectic Liquid–Crystal Storage Displays", Applied Physics Letters, vol. 22, No. 3 (Feb. 1, 1973), pp. 111–113.

Berezin et al., "Electrooptic Switching In Oriented Liquid–Crystal Films", Sov. J. Quant. Electron, vol. 3, No. 1 (Jul.–Aug. 1973), pp. 78–79.

*Primary Examiner*—Hung X. Dang
*Assistant Examiner*—Kenneth Parker

[57] ABSTRACT

A twisted nematic liquid crystal device has a liquid crystal layer between a pair of alignment layers. Glass plates with electrodes are disposed on opposite sides of the layers. The alignment layers have their alignment directions disposed mutually perpendicular and at ±45° with respect to adjacent linear polarizers. The pretilt angle of liquid crystal molecules in a surface region of the layer adjacent the alignment layer is different to that of liquid crystal molecules in a surface region of the layer adjacent the alignment layer.

15 Claims, 6 Drawing Sheets

TWISTED NEMATIC LIQUID CRYSTAL DEVICE

This invention relates to a twisted nematic liquid crystal device which is suitable as an optical shutter for alphanumeric or pixellated liquid crystal displays, which may be of the active matrix drive type, for use in television, imaging, virtual reality, projecting displays and computer screens, for example.

Twisted nematic liquid crystal devices commonly comprise a twisted nematic liquid crystal layer, first and second alignment layers disposed on opposite sides of the liquid crystal layer, and electrodes for applying a voltage across selected regions of the liquid crystal layer. In the case of devices which are to be used in transmissive mode, the liquid crystal and alignment layers are disposed between first and second linear polarisers. The polarisation axes of such linear polarisers may be arranged mutually parallel or mutually perpendicular. In the case of liquid crystal devices to be used in reflective mode, a linear polariser and a reflector are disposed on opposite sides of the liquid crystal and alignment layers. The twisted nematic liquid crystal layer acts as an optical wave guide and serves to rotate the polarisation vector of incoming, light through an angle (typically 90°) as it traverses the layer. By controlling the voltage applied to the electrodes, the device can be switched between light and dark states depending upon whether or not the polarisation vector is aligned with the polarisation axis of the polariser receiving the light which has passed through the liquid crystal layer.

The alignment layers are provided to ensure that the nematic liquid crystals have the required twisted structure in the zero voltage state of the device. This is achieved in known manner by rubbing or other alignment technique, e.g. by application of a chemical such as a surfactant to tile surface of the alignment layer, before contacting it with the liquid crystal material. In addition to being aligned with the alignment direction of the adjacent alignment layer, the liquid crystal molecules are also tilted up from the surface of the adjacent alignment layers at an angle which is referred to as the pretilt angle ($\theta_p$).

The rubbing direction is normally either parallel or perpendicular to the polarisation axis of the adjacent polariser, although some supertwisted nematic liquid crystal devices have different polariser orientations.

Thus, twisted nematic liquid crystal devices normally act to rotate or guide the polarisation vector, as noted above.

Other types of liquid crystal device use optical retardation as opposed to guiding of the incoming light. Examples of such retardation-mode devices are the Pi-cell and surface-stabilised ferroelectric liquid crystal displays. The liquid crystal layers in such devices behave as optical retarders and are placed at 45° to the polarisation axis of the or each linear polariser. Different polarisation states of light passing through an optical retarder suffer differing phase shifts, with the net result that light which has traversed such a layer will have a different polarisation state. For example, a quarter-wave optical retarder converts incoming linear polarised light at 45° to its optic axis, to outgoing circular polarised light. Similarly, a half-wave optical retarder with its optic axis at 45° to the vertical, converts a linear vertical polarisation state to a horizontal polarisation slate.

Voltages applied to either type of device (guiding or optical retardation) affect the orientation of the liquid crystal molecules and so control the optical properties of the liquid crystal layer. In the case of twisted nematic liquid crystal devices, a voltage may be used to determine whether or not guiding takes place, and some intermediate states of imperfect guiding can also be accessed to achieve greyscale. In the case of optical retardation-type devices used in, say, transmissive mode, voltages are chosen which switch the device between approximately half wave and zero retardations, with intermediate values of optical retardation to provide greyscale being accessible.

In the following description, references to operation between zero and half or quarter wave optical retardation will be readily understood by those skilled in the art as being the ideal operation to be achieved. In practice, devices are seldom capable of achieving perfect zero, half or quarter wave optical retardation and so references hereinafter to zero, half and quarter wave optical retardation are to be interpreted as covering practical devices which will normally be operated at as near to these optical retardations as is practicably possible.

S. Matsumoto et al (J. Apple Phys., vol 47, No. 9, Sep. 1976, pages 3842–3845) and F J Kahn, (Appl. Phys. Lett., Vol 22, No. 3, Feb. 1993, pages 111–113) disclose electrically tunable, optical retardation-type (or birefringence) devices having approximately zero pretilt on one alignment surface and 90° (homeotropic) pretilt on the other alignment surface. However, such devices have found limited application and place restrictions on the types of alignment surfaces and upon the voltages employable to switch the devices between states.

U.S. Pat. No. 4,385,806 discloses nematic liquid crystal devices where. separate, fixed (i.e. non-switchable) retardation plates with mutually perpendicular axes are provided externally of the liquid crystal cell between one of the polarisers and one of the alignment plates in a transmission type device having parallel rubbed alignment surfaces. There is also disclosed a device in which the alignment plates are rubbed in such a fashion that, when viewed from the side, the liquid crystal molecules adjacent the two alignment plates lie in a single plane and are tilted in opposite directions at the same pretilt angle. However, with this latter device, U.S. Pat. No. 4,385,806 teaches the preferred use of a pair of separate, additional mutually perpendicular retardation plates parallel to the front and rear polarisers in order to increase the viewing angle.

P D Berezin et al (Sov. J. Quant. Electron,, Vol 3 (1) pages 78/79, 1973) disclose use of a nematic liquid crystal layer, aligned at 45° between crossed polarisers, as an electrically switchable optical retarder which can alter the phase delay from 0 to $\pi$. However, there is no disclosure of the pretilt angle employed.

U.S. Pat. No. 4,635,051 discloses an electro-optical light gate, with a liquid crystal element comprising a pair of optical retarders disposed in substantially mutually parallel relation, with the projection of the optic axes orthogonally related and disposed at 45° relative to the polarising axes of a pair of polarising filters. The optical retarders can be operated as zero to substantially half-wave optical retarders. The use of a Pi-cell as each optical retarder is described, wherein the pre-tilt angles at the alignment surfaces are the same, with pre-tilt angles of between 2° and 5° being preferred in one embodiment, and a range of 10° to 30°, preferably 15° to 25°, being used for another embodiment.

EP-A-0467456 discloses a method of providing a surface alignment layer for use in liquid crystal display cells where the alignment layer consists of a liquid crystal in which at least some of the molecules have a permanently fixed orientation.

EP-A-0549283 discloses liquid crystal display devices in which a twisted nematic liquid crystal layer is disposed between first and second transparent glass plates with polarisers and alignment layers. The alignment layers define a plurality of minute unit regions in the liquid crystal layer, with each region being subdivided into first and second different liquid crystal aligning domains. The alignment layers are arranged and treated so that, in each first liquid crystal aligning domain, molecules of the liquid crystal layer near the first alignment layer are aligned along a first line with a first pretilt direction and a first pretilt angle, and molecules of the liquid crystal near the second alignment layer are aligned along a second line perpendicular to the first line with a second pretilt direction and second pretilt angle. The second pretilt direction is generally opposite to the first pretilt direction and the first pretilt angle is larger than the second pretilt angle. In each second liquid crystal aligning domain, the molecules of the liquid crystal layer are similarly aligned to those in the first liquid crystal aligning domain near the second alignment layer, but are aligned near the first alignment layer along the first line with the second pretilt direction and the first pretilt angle. This improves the viewing angle of the display. In use, molecules of the liquid crystal located intermediately between the alignment layers rise in accordance with the first pretilt angle when a voltage is applied across the liquid crystal layer. The optical characteristic of the liquid crystal is stated to depend upon the behaviour of these intermediate liquid crystal molecules.

U.S. Pat. No. 5,280,375 discloses liquid crystal display devices having a liquid crystal panel and comprising a twisted nematic liquid crystal layer between first and second substrates. First and second alignment layers are formed on the first and second substrates, respectively, with first and second pre-tilt angles, with the second pre-tilt angle being smaller than the first. A third alignment layer is provided on the second substrate near to the second alignment layer and has a third pre-tilt angle which is greater than the first. The liquid crystal panel is oriented so as to have a helical structure extending in a predetermined direction by the effect of the pre-tilt angles if nematic liquid crystal material having no tilt were to be filled in the space between the first and second substrates. However, the liquid crystal material actually filling such space has a twisting power effective to render the liquid crystal panel to be oriented so as to have a helical structure extending in a direction counter to said predetermined direction. This results in an arrangement wherein the liquid crystal molecules at the centre of the liquid crystal layer in regions associated with the second and third alignment layers, respectively, are tilted in opposite directions thereby reducing brightness changes as the viewing angle varies in the upward/downward viewing angle direction.

EP-A-0699938 discloses the use of a retarding layer disposed between a liquid crystal layer and a polarisation-conserving reflector, wherein the retarding layer is preferably in contact with the liquid crystal layer.

EP-A-0616240 discloses an active matrix liquid crystal display in which the nematic liquid crystal layer has a positive dielectric anisotropy and is disposed between alignment layers arranged so that the liquid crystal molecule pretilt angles at the surfaces of the first and second alignment layers are substantially parallel to each other.

It is an object of the present invention to provide a twisted nematic liquid crystal device which is capable of being used in a wide range of applications.

According to the present invention, there is provided a twisted nematic liquid crystal device comprising a twisted nematic liquid crystal layer; first and second alignment layers disposed on opposite sides of the liquid crystal layer, the first and second alignment layers having respective alignment directions which are mutually perpendicularly disposed so as to induce a substantially 90° twisted structure in the liquid crystal layer; a first linear polariser which is disposed on the opposite side of the first alignment layer to the liquid crystal layer and which has a polarisation axis disposed at an angle of substantially ±45° relative to the alignment direction of the first alignment layer; and electrodes for applying a voltage across the liquid crystal layer; wherein liquid crystal molecules in surface regions of the liquid crystal layer adjacent the respective alignment layers have pretilt angles which are greater than 0° and less than 90°; and wherein the pretilt angle of the liquid crystal molecules in the surface region adjacent the first alignment layer is different to that of the liquid crystal molecules in the surface region adjacent the second alignment layer.

By arranging for the pretilt angles in the respective surface regions to be un-equal, when a finite voltage is applied across the electrodes, the liquid crystal molecules in a central region of the liquid crystal layer begin to align in the direction of the electric field whilst the surface regions of the liquid crystal layer adjacent the alignment layers begin to resemble two un-twisted optical retarders which are mutually perpendicular but non-identical since the pretilt angles are unequal Since these optical retarders are mutually perpendicular to one another, the overall birefringence of the liquid crystal layer is found by subtracting the values of the optical retarders (or wave plates) from one another. By varying the voltage applied across the liquid crystal layer, the thicknesses of these wave plates can be varied, and hence the total birefringence of the device can be continuously tuned. The precise voltage causing a given birefringence will depend in part upon the pretilt angles in the two surface regions. Thus, the device according to the present invention is a tunable birefringence device with asymmetric surface pretilt angles having a 90° twisted structure in the zero voltage state. Operation is between finite voltage states, with the liquid crystal structure corresponding to two un-equal crossed optical retarders.

Thus, preferably, at least one voltage supply means is connected with the electrodes and is arranged so that, in use, the device is operated between finite voltage states with the liquid crystal molecules in the surface regions acting as two mutually perpendicular, unequal optical retarders optically decoupled by liquid crystal molecules in a central region of the liquid crystal layer.

The present invention has the advantage of incorporating two crossed (and hence subtracting) switchable retarding elements in a single device. In contrast, U.S. Pat. No. 4,385,806 discloses a device operating by switching surface regions of liquid crystal which act as two anti-parallel (and hence adding) optical retarders. In such cases, a zero retardation state is normally only obtained at high voltages or by use of further mutually perpendicular retarding plates. The necessity for these further mutually perpendicular retarding plates causes difficulty in fabricating such an element within a liquid crystal cell. For example, a typical retarder consisting of aligned polymer chains which, if used jointly as an optical retarder and alignment surface within the liquid crystal cell, will tend to align liquid crystal molecules parallel to its optic axis, and not perpendicular to the polymer chains, as required by the device of U.S. Pat. No. 4,385,806.

The use of un-equal pretilt angles in the liquid crystal molecules in the surface regions adjacent the two alignment layers as in the present invention enables a birefringence-mode operation over a wide range of voltages. A conventional twisted nematic device consisting of two equal pretilt surfaces set at 90° to one another, has zero birefringence above the voltage at which the structure corresponds to two crossed optical retarders, since these optical retarder are by definition identical and hence always subtract to zero optical retardation.

In principle, any difference in pretilt angle between the two surfaces is sufficient for a birefringence operation. This allows a wider choice of alignment surfaces than is available for the device described by F J Kahn (supra) which uses two surfaces, one with zero pretilt and one of 90° pretilt.

The pretilt angles in the device of the present invention may be between about 1° and about 89°, preferably between about 1° and about 87°. In one embodiment, the pretilt angle adjacent one of the alignment layers is about 3° and the pretilt angle of the liquid crystal molecules adjacent the other alignment layer is about 70°. In another embodiment, one of the pretilt angles is about 3° and the other pretilt angle is about 30°. However, the difference in pretilt angles is typically greater than about 3°, preferably greater than about 10° and most preferably greater than about 20°. A difference in the pretilt angles is needed to enable a difference in optical thickness ($\Delta n.d$) of the surface regions of the liquid crystal layer to be attained. For example, if the difference in the pretilt angles is small, then at least one of the surface layers can be very thick or consist of a high $\Delta n$ material so as to enable a half-wave difference to be accumulated over their thicknesses. The optical thickness can be tuned as desired by appropriately tuning the pretilt angle, the surface layer thickness or the $\Delta n$, or by a combination of one or more of these. The choice of route depends upon the intended use of the device. For example, high $\Delta n$ materials tend to have a high dielectric anisotropy which improves their response to electric fields, but such materials also tend to have a high viscosity, which reduces switching speed.

In order to ensure that the optical retarders defined in use by the surface regions of the optical layers are decoupled, the overall thickness of the liquid crystal layer is preferably not less than about 1 $\mu m$ and is typically in the range of 3 $\mu$ to 15 $\mu m$.

The required difference in pretilt angles can most conveniently be achieved by forming the first and second alignment layers of different materials, for example one of the alignment layers may be a polyimide layer whilst the other alignment layer may be an evaporated silicon oxide layer. However, it is within the scope of the present invention to use the same materials and to utilise a different rubbing or other alignment procedure to produce the required difference in pretilt angles.

The present invention is applicable to devices intended to be operated in transmissive mode. In which case, the device will further comprise a second linear polariser which is disposed on the opposite side of the second alignment layer to the liquid crystal layer and which has a polarisation axis disposed at an angle of substantially ±45° relative to the alignment direction of the second alignment layer. In such a case, the device will be operated at or between two finite voltages, one producing a net substantially half-wave optical retardation (for a given wavelength of light) and the other giving a substantially zero optical retardation. Operation at voltage levels intermediate these two finite voltages will give a greyscale which may be required for certain applications.

The present invention is also applicable to devices intended to be operated in a reflective mode, in which case a reflector will be disposed on the opposite side of the second alignment layer to the liquid crystal layer. In such a case, the device will be operated at or between two finite voltages, one producing a net substantially quarter-wave retardation (for a given wavelength of light) and the other giving substantially zero retardation. It will be appreciated that, in reflective mode, reflection of light in both directions through the liquid crystal layer will produce an overall substantially half-wave optical retardation.

The liquid crystal layer may be constituted by twisted (or chiral) nematic liquid crystal molecules or a chiral dopant may be incorporated in the liquid crystal in order to stabilise one twist state over the other in the 90° twisted structure. Almost any nematic liquid crystal materials can be used in the present invention. Typical examples are E7, a nematic liquid crystal material composed predominantly of cyanobiphenyl compounds, available from Merck; BL037, a high birefringence material; and ZL14792, a material designed for use in thin-film transistor twisted nematic (X) devices.

It is also within the scope of the present invention to incorporate at least one additional fixed (passive) optical retarder in conjunction with the liquid crystal cell to reduce the voltage at which the zero optical retardation state is obtained. This fixed optical retarder may be external or internal to the liquid crystal cell. The use of a fixed, in-cell optical retarder is of advantage when using the device in reflective mode since problems of parallax between the liquid crystal and the fixed optical retarder are reduced. The fixed in-cell optical retarder may be of the type disclosed in EP-A-0699938.

Embodiments of the present invention will now be described, by way of example, with reference to the accompanying drawings, in which.

Figure 1:
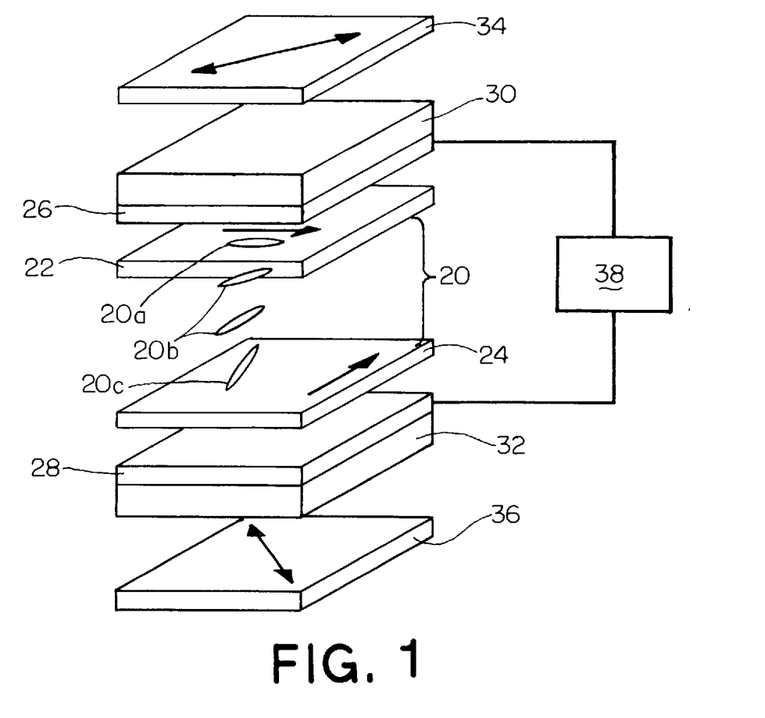
FIG. 1 is an exploded perspective view of a liquid crystal display element forming one embodiment of liquid crystal device according to the present invention.

Referring now to FIG. 1 of the drawings, the twisted nematic liquid crystal device comprises a cell in which a nematic liquid crystal layer 20 is disposed between first and second Alignment layers 22 and 24, respectively. The first and second alignment layers 22 and 24 have their respective alignment directions mutually perpendicularly disposed so as to induce a 90° twisted structure in the liquid crystal layer 20. In FIG. 1, the alignment distribution of liquid crystal molecules across the thickness of the layer 20 at zero voltage state is shown typically at regions 20a, 20b and 20c. As schematically illustrated in FIG. 1 (which shows the device at zero applied voltage), the liquid crystal molecules in surface region 20a adjacent first alignment layer 22 have their directors aligned with the alignment direction of the first alignment layer 22, whilst the liquid crystal molecules in the surface region 20c adjacent the second alignment layer 24 have their directors aligned with the alignment direction of the second alignment layer 24. The alignment directions of the alignment layers 22 and 24 are shown by the arrows thereon.

As also shown in FIG. 1, and in accordance with the present invention, the pretilt angles $\theta_o$ (i.e. the angles at which the liquid crystal molecules in the surface regions 20a and 20c, respectively, are tilted away from the respective layers) are different, the pretilt angle of the molecules in region 20a being much less than the pretilt angle of the molecules in region 20c. The tilt angles of the molecules in the legions 20a, 20b and 20c across the thickness of the layer 20 varies continuously and smoothly in the zero voltage state.

The cell of the device of FIG. 1 also includes first and second transparent conducting electrodes 26 and 28 which are provided on opposite sides of the assembly of layers 20, 22 and 24 and which are defined by coatings on first and second transparent glass plates 30 and 32, respectively. In accordance with usual practice, these glass plates 30 and 32 are spaced apart using appropriately positioned spacers (e.g spheres, fibres or strips) so that the liquid crystal material can be introduced between the alignment layers 22 and 24 in the usual way. The electrode layers 26 and 28 may be configured in any desired manner known per se to enable a variable voltage to be applied across all or selected parts of the liquid crystal layer 20. The electrode layers 26 and 28 may, for example, be configured in a manner known per se for an active matrix drive or a passive matrix drive to individually addressable pixels. Thus, non-linear/semiconducting electrical elements, such as thin-film transistors or diodes, can be included in the layer structure of the device.

The device of FIG. 1 further includes first and second linear polarisers 34 and 36 whose polarisation axes are mutually perpendicularly disposed, as indicated by the double-headed arrows thereon. As can be seen from FIG. 1, the first polariser 34 is disposed on the opposite side of the first alignment layer,22 to the liquid crystal layer 20 and has its polarisation axis disposed at 45° to the alignment direction of the alignment layer 22. Likewise, the second polariser 36 (which acts in use as an analyser) is disposed on the opposite side of the second alignment layer 24 to the liquid crystal layer 20 and has its polarisation axis disposed at 45° with respect to the alignment direction of the second alignment layer 24. In a modification (not shown), one of the polarisers 34 and 36 is orientated through 90° to that shown in FIG. 1 so that its polarisation axis is parallel to that of the other polariser.

The electrodes 26 and 28 are electrically connected to a variable voltage driver 38 or to a number of electrical drivers, situated at the ends of rows and columns in the case of a multi-pixel display.

Figure 2:
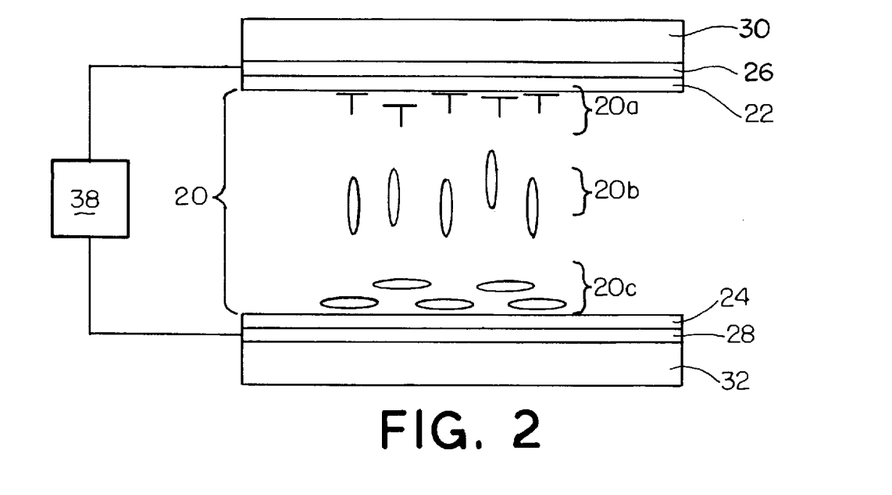
FIG. 2 is a cross-sectional view of the liquid crystal structure illustrated in FIG. 1 under an applied field.

As noted above, the liquid crystal layer 20 illustrated in FIG. 1 is shown at zero applied voltage, and the tilt of the molecules in the regions 20a, 20b and 20c varies smoothly across the thickness of the layer 20. If a finite vulgate is applied across the electrodes 26 and 28 using the driver 38, the molecules in the central region 20b of the layer 20 begin to align along the direction of the electric field and so become effectively homeotropic and the surface regions 20a and 20c begin to resemble two un-twisted optical retarders orientated at 90° with respect to one another (see FIG. 2) and are optically decoupled by the central region 20b. These two optical retarders (or wave plates) are non identical since the pretilt angles at the two surfaces have been deliberately made un-equal. In FIG. 2, the liquid crystal molecules 20a are symbolically shown as nails with heads, with the nail heads being tilted towards the viewer and the nail points tilting away.

Since these two wave plates are aligned at 90° to one another, the overall birefringence of the liquid crystal cell can be found by subtracting the values of the birefringence in the surface regions 20a and 20c. By varying the voltage applied across the liquid crystal layer 20, the thicknesses of the surface regions 20a and 20c can be varied, and hence the total birefringence of the device can be continuously tuned. The precise voltage causing a given birefringence depends in part upon the pretilt angles of the molecules in the surface regions 20a and 20c. For the device illustrated in FIG. 2, a half-wave retardation is obtained at a voltage at which the difference in optical retardation of the surface regions 20a and 20c is a half-wavelength. Zero optical retardation is obtained at high voltage when all of the molecules of the liquid crystal layer 20 are aligned with the field direction and hence are aligned orthogonal to the incoming polarisation state of the light. By varying the voltage applied across the liquid crystal layer between the two voltages corresponding to half wave and nearly zero optical retardation, a variation between maximum transmission and maximum extinction of light was observed. Intermediate voltage levels produced intermediate levels of grey.

Figure 3:
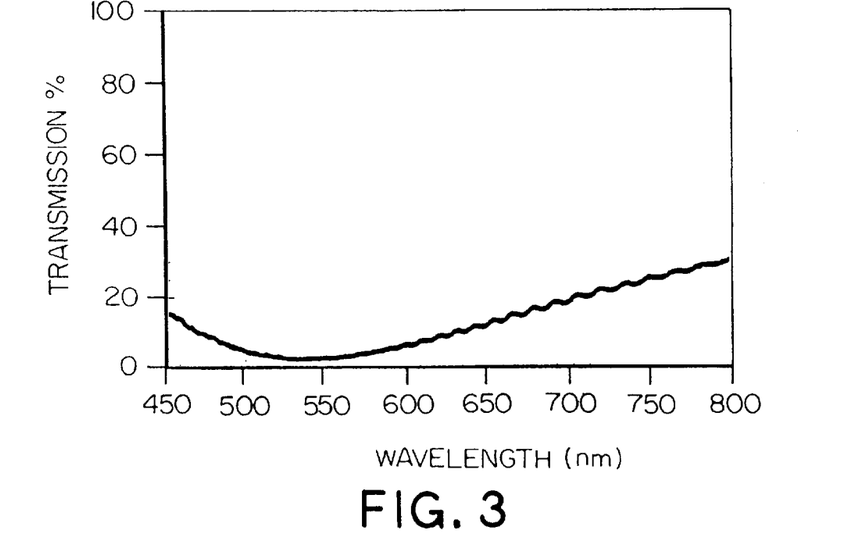
FIG. 3 is a graph in which transmission is plotted against wavelength for the device of FIGS. 1 and 2 under an applied voltage of 2.2 Vrms and with mutually parallel linear polarisers.
Figure 4:
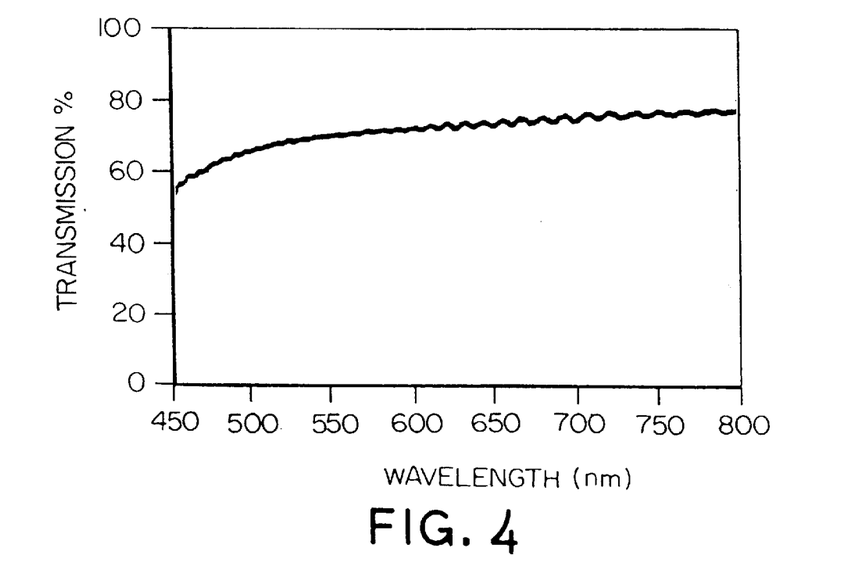
FIG. 4 is a graph in which transmission is plotted against wavelength for a device of the type illustrated in FIGS. 1 and 2 where the applied voltage is 10 Vrms and with the mutually parallel linear polarisers.

In a first example, a device similar to that of FIG. 1 was constructed where the nematic liquid crystal material of the layer 20 was E7 (Merck). The first alignment layer 22 was a rubbed polyimide producing a pretilt angle of about 3°. Evaporated silicon oxide formed the second alignment layer 24, with a pretilt angle of about 30°. The glass plates 30 and 32 were spaced about 10 $\mu$m apart using glass spacer beads (not shown). A 1 kHz square wave voltage was applied across the liquid crystal layer 20 via the electrodes 26 and 28 by the driver 38. FIG. 3 shows the transmission of the device for a 2.2 Vrms square wave with the liquid crystal cell approximating to a half-wave optical retarder at about 530 nm. FIG. 4 shows the transmission of the same device for a 10 Vrms square wave, with the liquid crystal cell approximating to a zero optical retarder.

Figure 5:
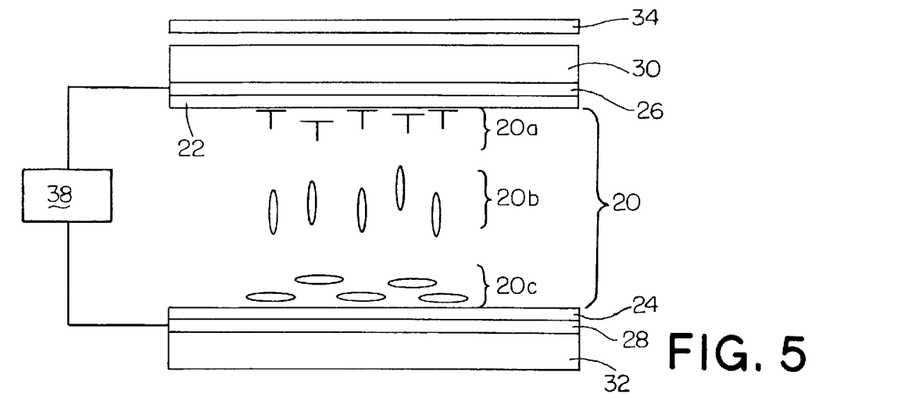
FIG. 5 is a schematic cross-sectional view of a liquid crystal device according to the present invention designed for use in reflective mode.

Referring now to FIG. 5 of the drawings, the device illustrated therein is of a similar construction to that of FIGS. 1 and 2 and similar parts are accorded the same reference numerals. However, the device of FIG. 5 is designed for use in reflective mode and so the second polariser 36 is omitted and the second glass plate 32 is provided with a reflective film thereon to act as a mirror. If desired, the second electrode layer 28 may form the mirror. The device of FIG. 5 is operated between two finite voltages, one producing a net quarter wave optical retardation for a given wavelength of light and the other producing a zero optical retardation. Incoming light is polarised by the linear polariser 34 and, as the light traverses the liquid crystal layer 20, it acquires a net optical retardation of zero or a quarter wave depending upon the voltage applied across the electrodes 26 and 28. After reflection by the mirror at the second plate 32, the light re-crosses the liquid crystal layer 20, thereby picking up a further optical retardation of either zero or a quarter wave. Light arriving back at the linear polariser 34 with net zero optical retardation will be transmitted since its polarisation state will have been unchanged by passage through the liquid crystal layer 20. However, light arriving back at the linear polariser 34 with a net half wave optical retardation will be extinguished as its polarisation state will have been rotated through 90°.

Figure 6:
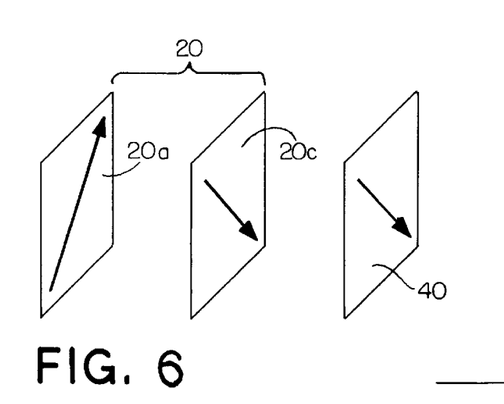
FIG. 6 is a schematic exploded perspective view showing the polarisation effect produced by three optical retarders.

The device of the present invention can incorporate a third, fixed (or passive) optical retarder which is used in conjunction with the variable (or active) optical retardation imparted by the liquid crystal layer 20 in order to reduce the voltage at which the zero optical retardation state is obtained. This fixed optical retarder may be external or internal to the liquid crystal cell. FIG. 6 shows the principle of using a third optical retarder 40 which is shown in conjunction with the optical retarders defined in use by the surface regions 20a and 20c of the liquid crystal layer 20. For convenience, these latter optical retarders will be referred to hereinafter as optical retarders 20a and 20c. Suppose the retardation of the optical retarder 20a is larger than that of the optical retarder 20c. In practice, the surface region of the liquid crystal layer with the higher pretilt angle will exhibit the lower retardation to light incident normal to the glass plates 30 aid 32. The retardation of these two optical retarders 20a and 20c taken together is found by subtracting the retardation of optical retarder 20c from that of optical retarder 20a and has an optic axis lying in the same direction as that of the latter since this is the dominant optical retarder. By adding the third optical retarder 40, which has its optic axis aligned with that of the optical retarder 20c, and with a retardation equal to the difference in retardation of retarders 20a and 20c, the net retardation of the three optical retarders can be made to equal zero. Thus, the use of a third optical retarder 40 allows a zero optical retardation state to be obtained from the device without the need for all molecules in the liquid crystal to align along the direction of the field, i.e. in practice without the need for large voltages.

The third optical retarder 40 may be an external element which can be attached, for example, by adhesive, to the outer face of the first glass plate 30 illustrated in FIG. 1. Alternatively, the third optical retarder 40 may lie inside the liquid crystal cell defined between the first and second plates 32. This latter arrangement has the advantage of reducing problems of parallax associated with optical retarders placed outside the liquid crystal cell. Further, an in-cell fixed optical retarder can be of such design that it also acts as one of the alignment layers 22 and 24. Attention is drawn in this regard to E-P-A-0699938 whose disclosure is included herein by reference and which discloses the use of an internal optical retarder with a liquid crystal display without reference to the type of alignment which such an element might induce in a liquid crystal layer. For example, the fixed optical retarder 40 might serve the function of the second alignment layer 26.

Figure 7:
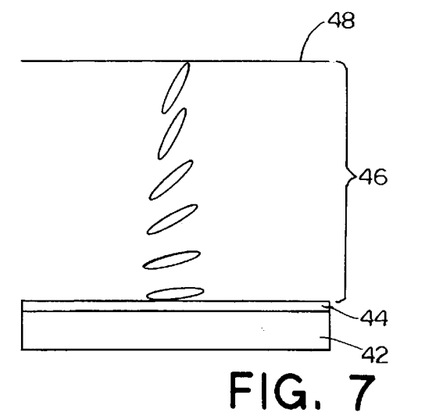
FIG. 7 is a cross-sectional view of a liquid crystal deposited on a polyimide alignment surface, with the other surface of the liquid crystal being free.

Referring now to FIG. 7, there is shown an assembly of glass plate 42 (with electrode-not shown), alignment layer 44, and liquid crystal layer 46 which can be used to replace the second substrate 32, second electrode 28 and second alignment layer 24 in the device of FIG. 1. Glass plate 42, which is partly coated with a transparent electrode, e.g. of indium tin oxide (ITO), has a thin layer 44 of a polyimide spin coated onto it in a manner known per se. This polyimide layer 44 is rubbed to provide an alignment surface for liquid crystal layer 46. A mixture of a nematic liquid crystal material (for example E7 from Merck) and an acrylate-based material (for example RM82 from BDH Limited; RM253 from Merck or RM308 from Merck) is then spin coated as a thin (typically approximately 100 nm) layer 46 onto the rubbed polyimide surface 44. The nematic component of the spun mixture is aligned by the surface of the underlying polyimide layer 44, and is pretilted at such surface by a small angle (typically about 3°). The other surface 48 of the layer 46 is a free surface and is kept under a nitrogen atmosphere. At the surface 48, the liquid crystal molecules adopt a high pretilt angle which is typically greater than 70°. Thus, the nematic component of the thin spun layer 46 tends to adopt a tilt which varies continuously throughout its thickness from the small pretilt angle defined at the surface of the underlying polyimide layer 44 to the much higher pretilt angle adopted at the surface 48. The actual pretilt angle adopted by the liquid crystal molecules at the gas/liquid crystal interface is dependent upon the type of liquid crystal, the type of gas and the presence of any external magnetic or electric fields etc. In addition, the pretilt angle at such interface will depend upon the proximity of the underlying polyimide layer 44 (i.e. on the thickness of the spun layer 46). As can be seen from FIG. 8, the thinner layer 46 produces a smaller pretilt angle at the surface 48.

Figure 8:
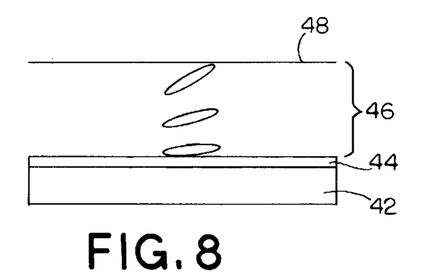
FIG. 8 is a view similar to that of FIG. 7 but with a thinner liquid crystal layer.

Exposing the nematic/acrylate mixture to UV light induces the acrylate component to undergo a photochemical reaction to convert the low molar mass acrylate to a polymer. The polymer so formed acts to fix the orientation and tilt structure of the liquid crystal molecules in the layer 46 permanently. Thus, following UV illumination, a thin nematic/polymer layer 46 results having an exposed surface 48 in which at least some of the nematic molecules are fixed and pretilted at some angle which is determined by the thickness of the layer 46. Thus, the pretilt angle can be tuned as desired, and such layer can then be used to define one of the alignment surfaces 22 and 24 for the bulk liquid crystal layer 20 in the device.

Besides providing a pretilted alignment surface for the bulk liquid crystal layer 20, the thin nematic/acrylate polymer layer 46 described in relation of FIGS. 7 and 8 is also inherently birefringent and thereby serves as the third optical retarder as noted above. The combination of these features is advantageous in the device according to the present invention where the first and second alignment layers 22 arid 24 are mutually perpendicularly disposed. If the two alignment layers 22 and 24 were mutually parallel or anti-parallel as in a typical pi-cell or a Freedericksz device, the fixed optical retarder described with reference to FIGS. 7 and 8 would actually be counterproductive to the achievement of zero optical retardation at low voltages.

Figure 9:
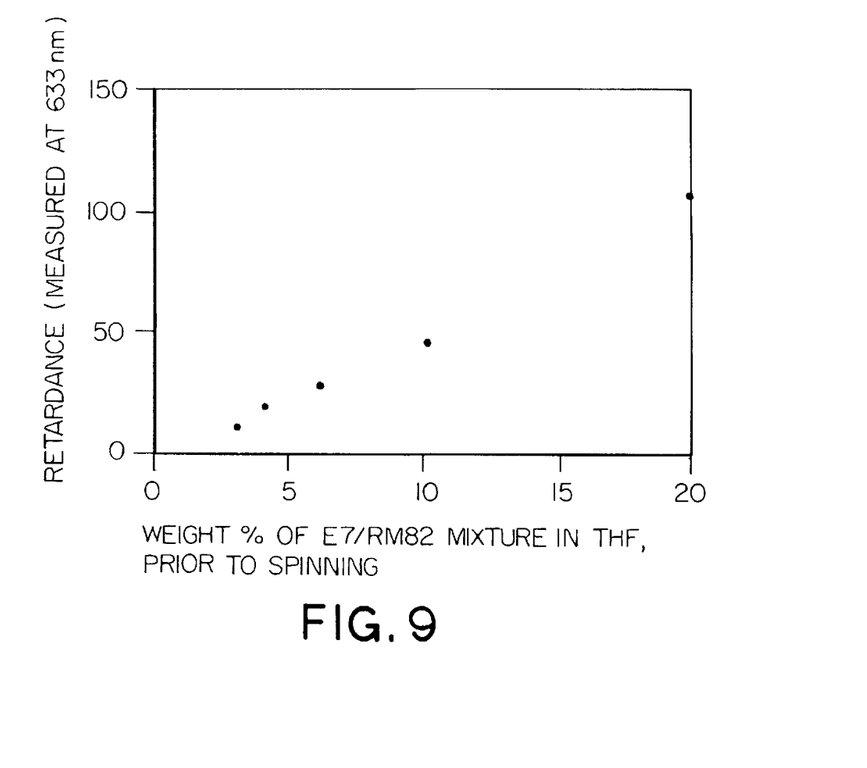
FIG. 9 is a graph showing the variation of optical retardation of a nematic/polymer layer with concentration of spun solution.
Figure 10:
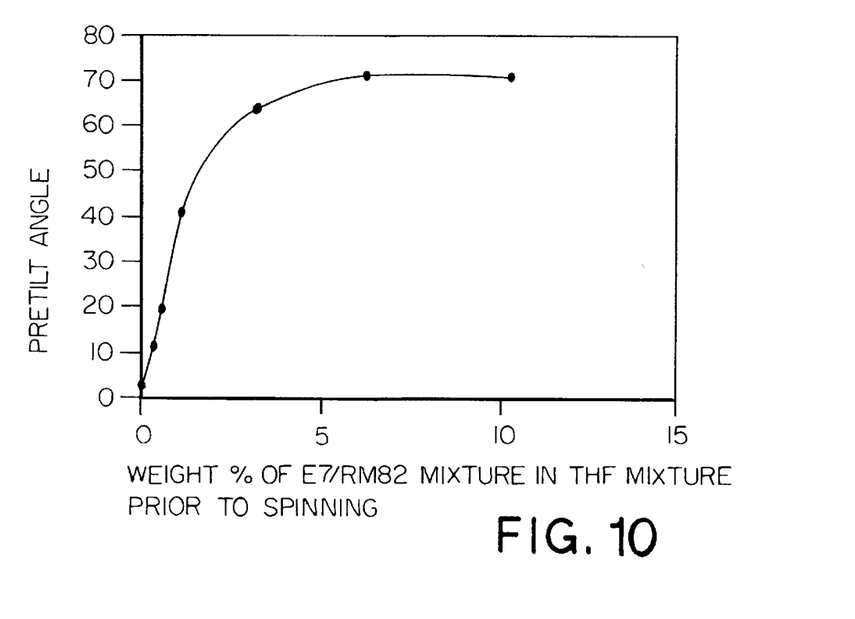
FIG. 10 is a graph showing the variation of pretilt angle of the same nematic/polymer layer as used for FIG. 9, with concentration of spun solution.

FIG. 9 shows the variation in optical retardation of a thin layer of E7 and RM82 in a percent weight ratio of 90:10. The x-axis shows the concentration of the E71/RM82 mixture in THF (tetrahydrofuran) which formed the solvent during spin coating of the layer. Spinning was performed at 2000 rpm for 10 seconds forming a coating onto ITO-glass plates pre-coated with polyimide and rubbed. The layers were then UV cured under a nitrogen gas flow for 10 minutes before recording the values of retardation plotted. FIG. 10 shows the pretilt angle adopted by the liquid crystal E7 when deposited onto such E7/RM82 alignment surfaces.

In a further example, a device similar to that of FIG. 1 was constructed to demonstrate the use of an alignment layer which has both a high pretilt and an optical retardation. In this example, a rubbed polyimide with a pretilt angle of about 3° was used as the first alignment layer 22, whilst the second alignment layer 24 consisted of a layer of rubbed polyimide with a pretilt angle of about 3° onto which had been spun a layer of E7 liquid crystal and RM82 acrylate in a 90:10 weight ratio. The E7/RM82 mixture was spun at 2000 rpm for 10 seconds from a THF solvent using 20 wt % of the mixture in THF. The spun layer was exposed to UV light for 10 minutes under a nitrogen atmosphere. This produced a thin E7/RM82 polymer alignment layer with a fixed optical retardation of about 110 nm. E7 was used as the liquid crystal material in the layer 20. The pretilt angle with the second alignment layer 24 produced as described above was about 70°. The first and second linear polarisers 34 and 36 had their polarisation axes mutually perpendicular, with the polarisation axis of the first polariser 34 being disposed at 45° to the rubbing direction of the polyimide alignment surface 22.

Figure 11:
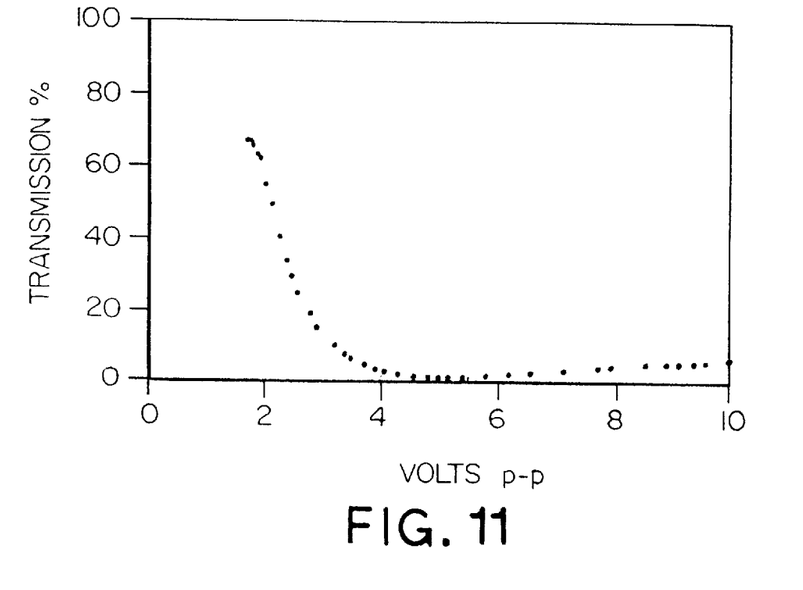
FIG. 11 is a graph showing the variation of transmission with voltage of a nematic/polymer aligned device where the linear polarisers are mutually perpendicular.
Figure 12:
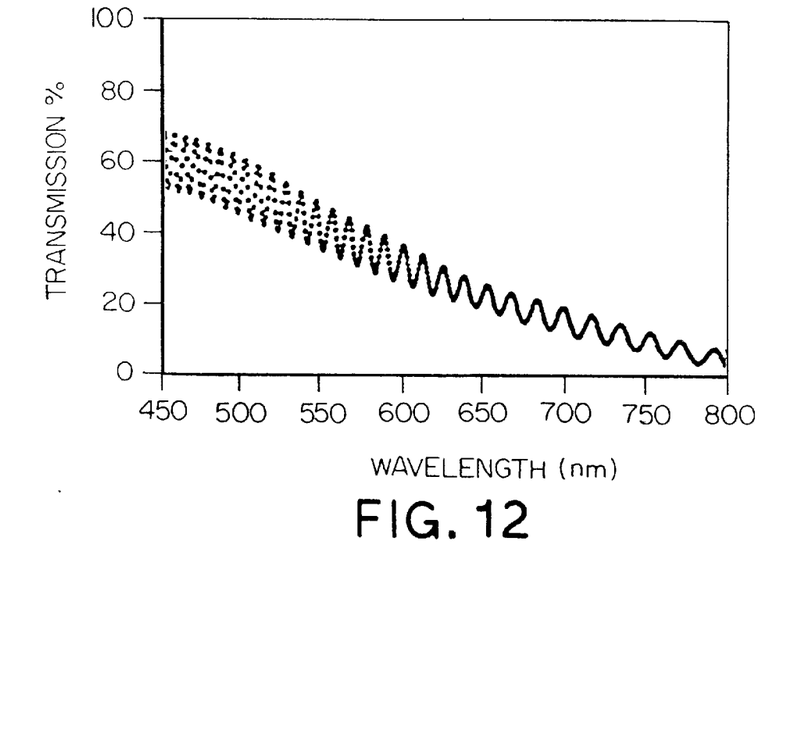
FIG. 12 is a graph showing the variation of transmission with wavelength of the same nematic/polymer aligned device as used for FIG. 11, wherein the applied voltage is 2.05 Vrms and the linear polarisers are mutually perpendicular.
Figure 13:
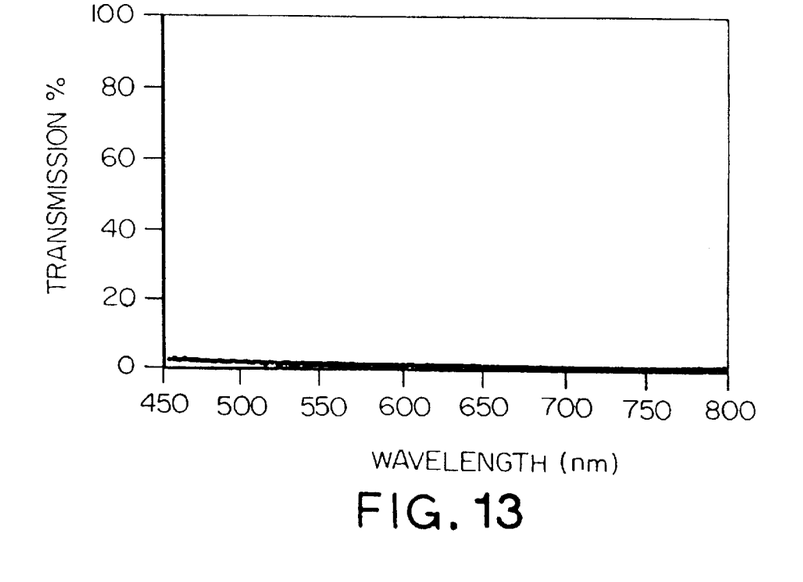
FIG. 13 is a graph showing the variation of transmission with wavelength of the same nematic/polymer aligned device as used for FIGS. 11 and 12, wherein the applied voltage is 5 Vrms and the linear polarisers are mutually perpendicular.

A 1 kHz square wave was applied to the liquid crystal. FIG. 11 shows the transmission of light of wavelength 550 nm through the device as a function of applied voltage. FIG. 12 shows the variation of transmission of the device with wavelength of light for an applied voltage of 2.05 Vrms with the device between polarisers approximating as a half wave retarder. FIG. 13 shows the transmission at 5 Vrms with the device approximating as a zero-wave optical retarder.

As can be deduced from FIG. 12, it is advantageous to form an internal fixed optical retarder from the same liquid crystal material (e.g. E7) as used in the bulk liquid crystal layer 20. Most materials disperse light, i.e. the retardation value of a given optical retarder is a function of the wavelength at which the retardation is measured. Two optical retarders made from different materials will therefore yield a net optical retardation which is a function of wavelength when placed together. However, in the case where the internal fixed optical retarder is predominantly composed of the same material as the bulk liquid crystal layer 20, dispersion is compensated for and an almost achromatic zero optical retardation state can be achieved.

The choice of material forming the in-cell fixed optical retarder is not confined to those referred to hereinabove. It is possible, for instance, to use other photo-polymerising mesogens, other liquid crystals or indeed photo-polymerising materials which are themselves mesogenic (i.e. show liquid crystal phases).

What is claimed is:

1. A twisted nematic liquid crystal device comprising:
    a twisted nematic liquid crystal layer;
    first and second alignment layers disposed on opposite sides of the liquid crystal layer, the first and second alignment layers having respective alignment directions which are mutually perpendicularly disposed so as to induce a substantially 90° twisted structure in the liquid crystal layer;
    a first linear polarizer which is disposed on the opposite side of the first alignment layer to the liquid crystal layer and which has a polarization axis disposed at an angle of substantially ±45° relative to the alignment direction of the first alignment layer; and
    electrodes for applying a voltage across the liquid crystal layer,
    wherein liquid crystal molecules in surface regions of the liquid crystal layer adjacent the respective alignment layers have pretilt angles which are greater than 0° and less than 90°, and
    wherein a pretilt angle of the liquid crystal molecules in tho surface region adjacent the first alignment layer is different from a pretilt angle of the liquid crystal molecules in the surface region adjacent the second alignment layer.

2. A device as claimed in claim 1, wherein at least one voltage supply means is connected with the electrodes and is arranged so that, when in use, the device is operated between finite voltage states with the liquid crystal molecules in the surface regions acting as two mutually perpendicular, unequal optical retarders optically decoupled by liquid crystal molecules in a central region of the liquid crystal layer.

3. A device as claimed in claim 1, further comprising a fixed optical retarder.

4. A device as claimed in claim 3, wherein the fixed optical retarder defines the second alignment layer.

5. A device as claimed in claim 3, wherein the fixed optical retarder includes a liquid crystal material.

6. A device as claimed in claim 5, wherein the liquid crystal material in the fixed optical retarder is the same as liquid crystal material of the liquid crystal layer between the first and second alignment layers.

7. A device as claimed in claim 3, wherein the fixed optical retarder is spaced from the liquid crystal layer.

8. A device as claimed in claim 1, wherein the pretilt angles are between about 1° and about 87°.

9. A device as claimed in claim 1, wherein the difference in the pretilt angles is greater than about 5°.

10. A device as claimed in claim 9, wherein the difference in the pretilt angles is greater than about 10°.

11. A device as claimed in claim 10, wherein the difference in the pretilt angles is greater than about 20°.

12. A device as claimed in claim 1, which is adapted to be operated in transmissive mode and which includes a second linear polarizer disposed on the opposite side of the second alignment layer to the liquid crystal layer, the second linear polarizer having a polarization axis disposed at an angle of substantially ±45° relative to the alignment direction of the second alignment layer.

13. A device as claimed in claim 12, which is adapted to be operated at or between a voltage causing a net substantially zero optical retardation in the liquid crystal layer and a voltage causing a net substantially half-wave optical retardation in the liquid crystal layer.

14. A device as claimed in claim 1, which is adapted to be operated in reflective mode, wherein a reflector is disposed on the opposite side of the second alignment layer to the liquid crystal layer.

15. A device as claimed in claim 14, which is adapted to be operated at or between a voltage causing a net substantially zero optical retardation in the liquid crystal layer and a net substantially quarter-wave optical retardation in the liquid crystal layer.

* * * * *